United States Patent
Denning

(10) Patent No.: US 7,667,435 B2
(45) Date of Patent: Feb. 23, 2010

(54) SECONDARY BATTERY PROTECTION CIRCUIT WITH OVER VOLTAGE TRANSIENT PROTECTION

(75) Inventor: Bruce S. Denning, Monterey, CA (US)

(73) Assignee: O2Micro International Limited, Georgetown, Grand Cayman (KY)

(*) Notice: Subject to any disclaimer, the term of this patent is extended or adjusted under 35 U.S.C. 154(b) by 136 days.

(21) Appl. No.: 11/774,331

(22) Filed: Jul. 6, 2007

(65) Prior Publication Data
US 2008/0012532 A1   Jan. 17, 2008

Related U.S. Application Data

(63) Continuation of application No. 10/879,655, filed on Jun. 29, 2004, now abandoned, which is a continuation-in-part of application No. 10/832,620, filed on Apr. 27, 2004.

(60) Provisional application No. 60/556,254, filed on Mar. 25, 2004.

(51) Int. Cl.
*H02J 7/00* (2006.01)
*H02J 7/04* (2006.01)
*H02J 7/06* (2006.01)
*H02H 3/00* (2006.01)
*H02H 3/20* (2006.01)
*H02H 3/22* (2006.01)

(52) U.S. Cl. .................. 320/132; 320/162; 320/163; 361/86; 361/91.1; 361/111

(58) Field of Classification Search .............. 320/132, 320/148, 149, 151, 152, 156–159, 161–164; 361/78, 79, 83, 86, 88, 89, 90, 91.1, 91.3, 361/103, 104, 111; 324/433
See application file for complete search history.

(56) References Cited

U.S. PATENT DOCUMENTS 5,517,379 A * 5/1996 Williams et al. .............. 361/84

(Continued)

FOREIGN PATENT DOCUMENTS

EP   0181112   3/1986

(Continued)

OTHER PUBLICATIONS

Japanese Office Action dated Nov. 25, 2008 issued in related Japanese Patent Application No. 2005090074.
English translation of related Chinese Office Action dated Mar. 9, 2007, 5 pages.
English language translation of Taiwanese Office Action dated May 26, 2006 issued in related Taiwanese Patent Application No. 094104237.
Decision of Rejection issued in Japanese Patent Application No. 2005-090074 dated Aug. 4, 2009.

*Primary Examiner*—Edward Tso
*Assistant Examiner*—Richard V Muralidar
(74) *Attorney, Agent, or Firm*—Grossman, Tucker, Perreault & Pfleger, PLLC

(57) ABSTRACT

A secondary battery protection circuit may include an over voltage detector circuit configured to monitor a voltage level of an associated cell of a rechargeable battery and provide an output signal to a switch in response to a comparison of the voltage level of the cell to an over voltage threshold level. The switch may be coupled between the rechargeable battery and a DC power source and capable of moving between conducting and non-conducting states. The switch may also be responsive to the output signal to protect the rechargeable battery if the voltage level of said cell is greater than the over voltage threshold level for a time interval less than or equal to a transient time interval.

24 Claims, 5 Drawing Sheets

U.S. PATENT DOCUMENTS

| | | | |
|---|---|---|---|
| 5,539,299 A | 7/1996 | Fernandez et al. | |
| 5,789,902 A | 8/1998 | Abe et al. | |
| 6,118,253 A * | 9/2000 | Mukainakano et al. | 320/134 |
| 6,331,763 B1 * | 12/2001 | Thomas et al. | 320/136 |
| 6,888,355 B2 | 5/2005 | Kitazawa et al. | |

FOREIGN PATENT DOCUMENTS

| | | |
|---|---|---|
| GB | 2292845 | 3/1996 |
| JP | S61221539 | 10/1986 |
| JP | 08079982 | 3/1996 |
| JP | 09289738 | 4/1997 |
| JP | 09130988 | 5/1997 |
| JP | 11178222 | 7/1999 |
| JP | 200069689 | 3/2000 |
| JP | 2000069689 | 3/2000 |

* cited by examiner

SECONDARY BATTERY PROTECTION CIRCUIT WITH OVER VOLTAGE TRANSIENT PROTECTION

CROSS REFERENCE TO RELATED APPLICATIONS

This application is a continuation application of U.S. Nonprovisional application Ser. No. 10/879,655 filed Jun. 29, 2004, which itself continuation-in-part application of U.S. Nonprovisional application Ser. No. 10/832,620 filed Apr. 27, 2004, the teachings of which are incorporated herein by reference, which claims the benefit of U.S. Provisional Application Ser. No. 60/556,254 filed Mar. 25, 2004.

FIELD

This disclosure relates to a secondary battery protection circuit with over voltage transient protection. Utility for such a circuit may be found in a variety of electronic devices utilizing rechargeable batteries.

BACKGROUND

A variety of electronic devices may utilize a rechargeable battery. Such electronic devices may include laptop computers, cell phones, personal digital assistants, power tools, etc. A variety of rechargeable batteries may be utilized in such devices, e.g., lithium ion, nickel-cadmium, and nickel-metal hydride batteries. Some rechargeable batteries, in particular lithium ion batteries, may become hazardous under certain conditions including over voltage conditions. Hence, a variety of battery protection circuits may be utilized in battery packs of such rechargeable batteries.

In some instances, a secondary battery protection circuit may be utilized in addition to a primary battery protection circuit. The secondary battery protection circuit may provide an output to a fuse element to permanently disable the fuse element in response to a sustained over voltage condition. However, such secondary protection circuit does not protect against short over voltage spikes. In addition, the fuse element is not capable of moving between conductive and non-conductive states since once the fuse element enters a non-conductive state, it cannot move back to a conductive state (i.e., once tripped the fuse element would need to be replaced).

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
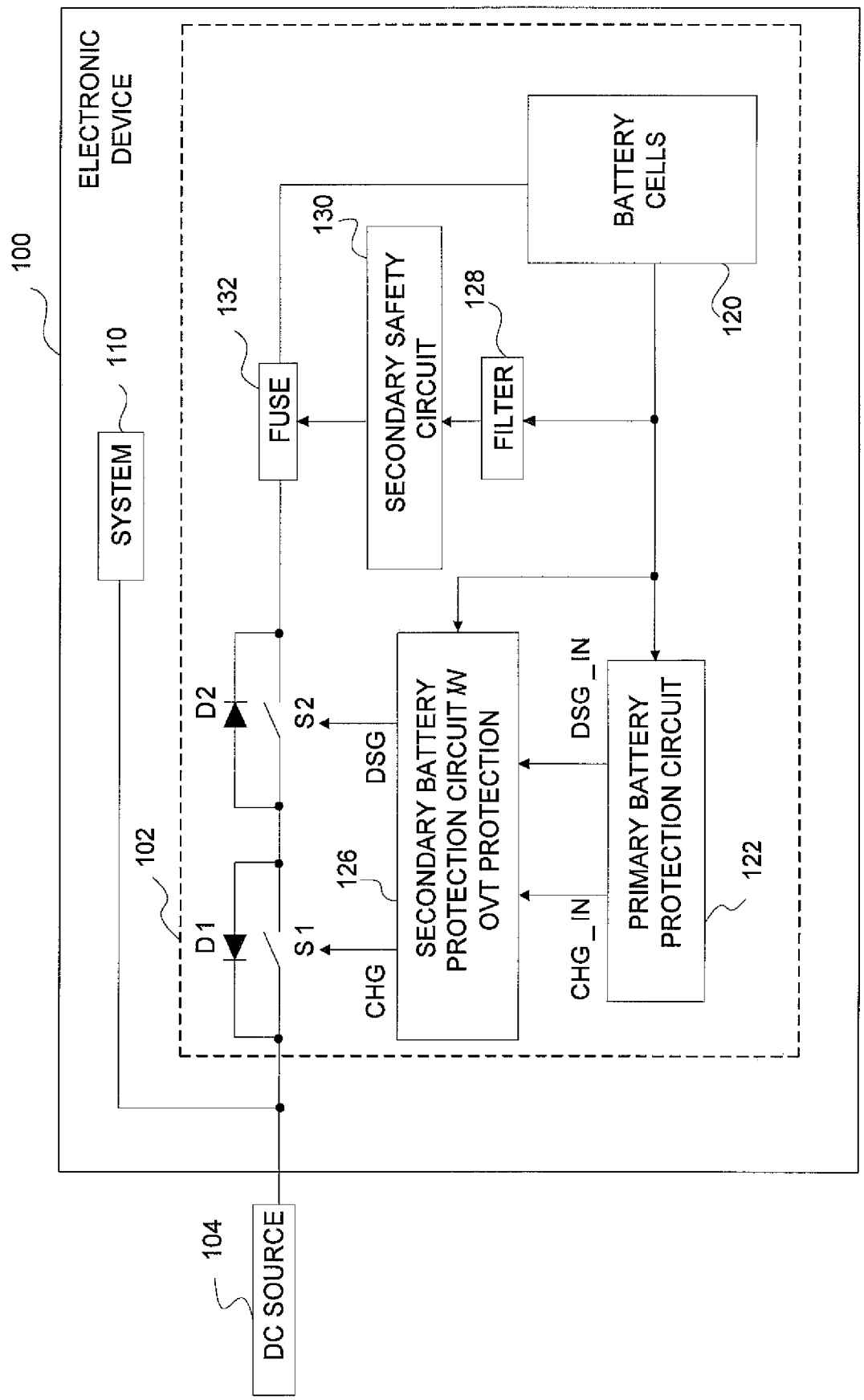
FIG. 1 is a block diagram of an electronic device having a secondary battery protection circuit with over voltage transient protection.

FIG. 1 is a block diagram of an electronic device 100 having a DC power source 104 and a battery pack 102 to supply power to the system 110. If the DC source 104 (e.g., an ACDC adapter) is not present, power may be supplied to the system from the battery pack 102. If the DC source 104 is present, it may supply power to the system 110 and provide power to recharge the cells 120 of the battery. In a battery charging mode, switch S1 may be closed and switch S2 may be open in one instance. In this instance, current may then flow through closed switch S1 and diode D2 in parallel with open switch S2 to provide charging current to the cells 120. In another battery charging mode, both switches S1 and S2 may be closed to reduce losses due to the diode D2. In a battery supply mode, switch S1 may be open and switch S2 may be closed in one instance. Current from the battery cells 120 to the system 110 may then flow through closed switch S2 and diode D1 in parallel with open switch S1. In another battery supply mode, both switches S1 and S2 may be closed to reduce losses due to the diode D1.

The battery pack 102 may also include a primary battery protection circuit 122, a filter 128, a secondary battery protection circuit 130, a fuse element 132, and a secondary battery protection circuit 126 with over voltage transient (OVT) protection consistent with an embodiment. The primary battery protection circuit 122 may monitor a number of conditions including the voltage level of each of the cells 120 as well as charging and discharging current levels and provide charge (CHG_IN) and discharge control signals (DSG_IN). The voltage level of each of the cells 120 may also be monitored by the secondary battery protection circuit 130 via the filter 128. The filter 128 serves to filter out shorter duration over voltage transient spikes. The secondary battery protection circuit 130 monitors the voltage level of each of the cells 120 and provides a signal to the fuse element 132 to blow or open the fuse element if a voltage level of one of the cells is greater than an over voltage threshold level for a sustained time interval. The filter 128 therefore serves to stop the fuse element 132 from blowing due to shorter duration over voltage transient spikes.

The battery pack 102 may also include a secondary battery protection circuit 126 with over voltage transient protection circuit to protect the cells 120 if the voltage level of any one of the cells is greater than an over voltage threshold level for a time interval less than or equal to a transient time interval. As used herein, a "transient time interval" is the time interval it takes for a permanent protection mechanism, e.g., fuse 132 in one instance, of an associated battery pack to be activated in case of a sustained over voltage condition. The transient time interval may vary based on the particular cell chemistry, the particular permanent protection mechanism, and other considerations. In one embodiment, the transient time interval may be about 10 microseconds (μs). As such, the secondary battery protection circuit 126 protects the cells 120 from shorter over voltage spikes that would otherwise not activate any other more permanent protection mechanisms. For example, the secondary battery protection circuit 126 may protect the cells 120 from a short over voltage spike having a magnitude of only 1 millivolt (mV) and a duration of only 1 μs.

In addition to protecting the cells 120 from over voltage transient conditions, the secondary battery protection circuit 126 may also protect the cells 120 from sustained over voltage conditions for time intervals greater than the transient time interval. With this capability, the secondary battery protection circuit 126 may provide, in part, a duplicative function of the secondary safety circuit 130. As such, one or more of the filter 128, secondary safety circuit 130, and fuse element 132 may be removed in the battery pack 102 saving component costs and space. Alternatively, such components 128, 130, 132 may be retained and the sustained over voltage protection feature of the secondary battery cell protection circuit 126 may provided an added layer of reliability.

Figure 2:
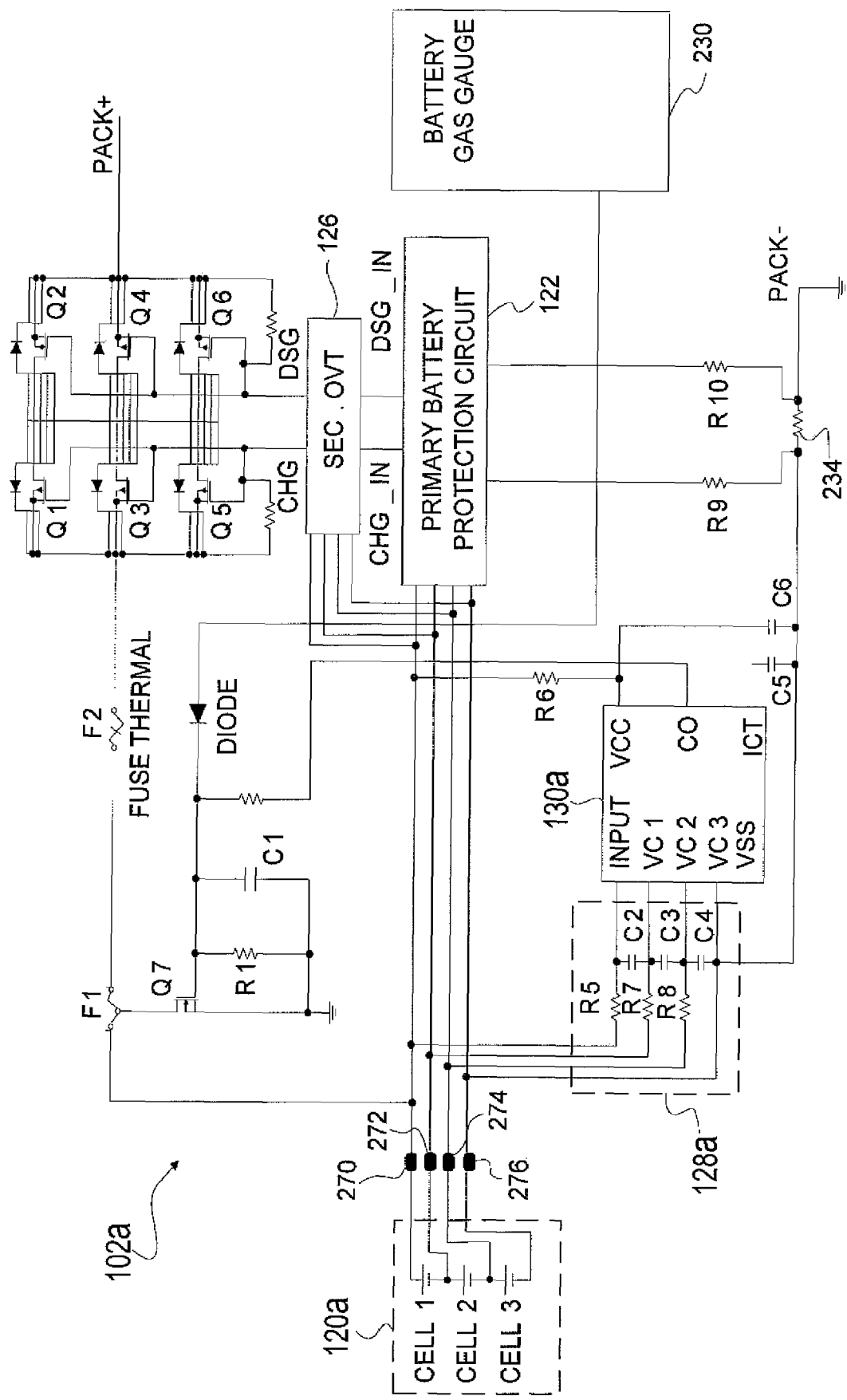
FIG. 2 is a block diagram of one embodiment of the battery pack of FIG. 1.

FIG. 2 is a block diagram of one embodiment of a battery pack 102a that may be utilized in the electronic device 100 of FIG. 1. The battery cells 120a may include cell1, cell2, and cell3. Each battery cell may be coupled to the primary battery protection circuit 122, the RC filtering network 128a, and the secondary battery protection circuit 126. The RC filtering network 128a may include resistors R5, R7, and R8 and capacitors C2, C3, and C4. In one embodiment, resistors R5, R7 and R8 may also be equal to 1 kilo-ohm (kΩ) and capacitors C2, C3, and C4 may all be equal to 0.1 microfarad (μF).

The RC filtering network 128a may filter out short duration over voltage transient conditions and provide an input to the secondary safety circuit 130a representative of the voltage level of each of the cells 120a. If the voltage level of any one of the cells (cell1, cell2, or cell3) exceeds an over voltage threshold level, e.g., 4.2 volts, for greater than a transient time interval, then the secondary safety circuit 130 may provide a control signal to the control terminal of transistor Q7 causing transistor Q7 to conduct and the fuse F1 to blow. An additional thermal fuse F2 may also be coupled in series with the fuse F1.

The charging switch S1 and discharging switch S2 functionality of FIG. 1 may be implemented with transistors Q1 through Q6 as illustrated in FIG. 2. The transistors Q1 through Q6 may be any variety of transistors including field effect transistors (FETs) such as a metal oxide semiconductor field effect transistors (MOSFETs) and bipolar junction transistors. A battery gas gauge circuit 230 may also be included in the battery pack 102 to monitor the capacity of the cells 120a and provide an output signal representative of the remaining capacity of the cells 120a based on a variety of monitored conditions. A sense resistor 234 may provide current information to the primary safety circuit 122.

The secondary battery protection circuit 126 may be positioned between the primary safety circuit 122 and the transistors Q1 through Q6. The secondary battery protection circuit 126 may accept a charging control signal (CHG_IN) and a discharge control signal (DSG_IN) from the primary battery protection circuit 122 and provide an output charging control signal (CHG) and discharge control signal (DSG) to the transistors Q1 through Q6. The secondary battery protection circuit 126 may also accept signals from the terminals 270, 272, 274, and 276 representative of the voltage level of the cells 120a. In general, the secondary battery protection circuit 126 may monitor the voltage level of each of the cells 120a and provide an output signal to the transistors Q1 through Q6 to protect the cells 120a in case of an over voltage transient condition.

Figure 3:
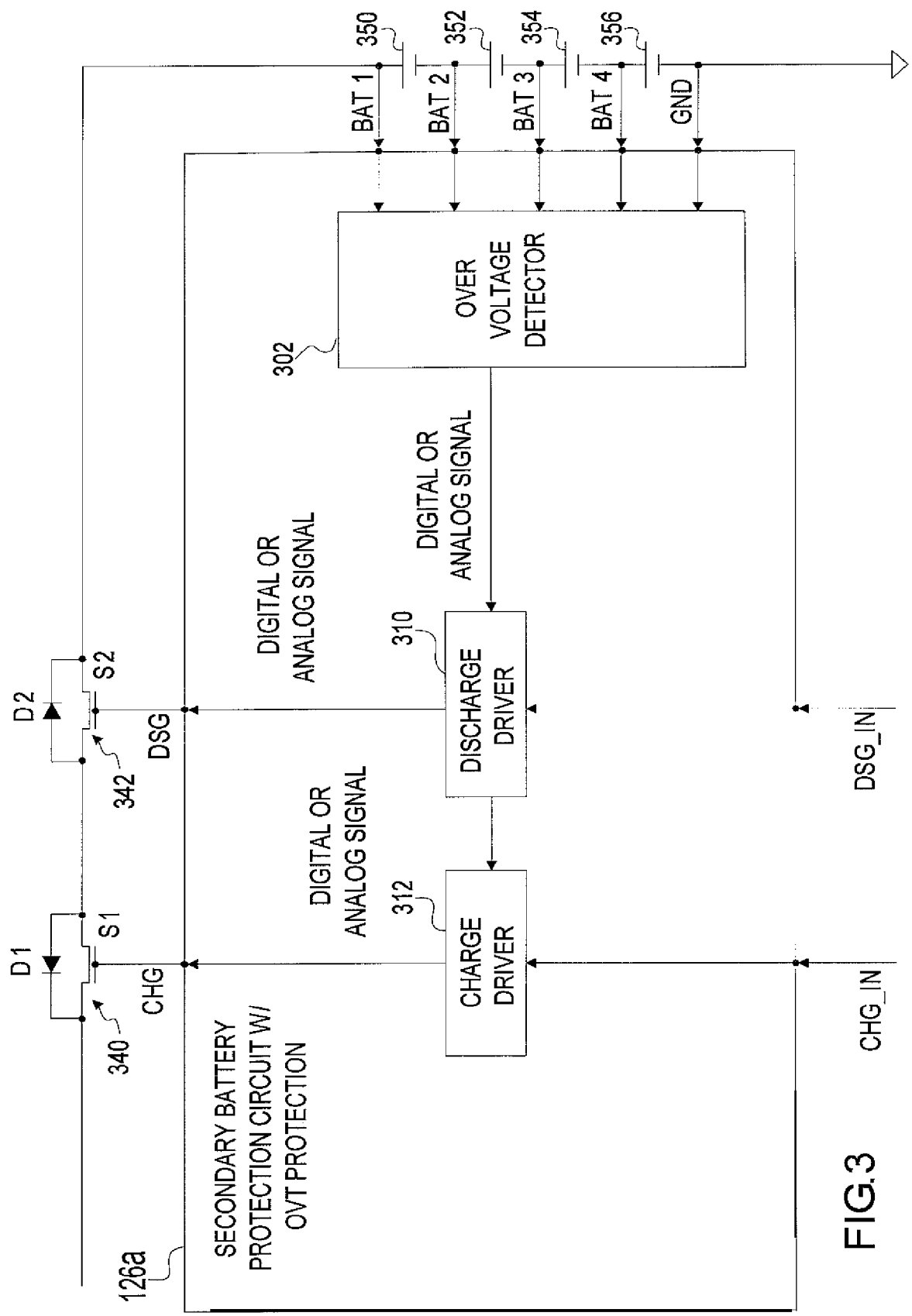
FIG. 3 is a block diagram of one embodiment of a secondary battery protection circuit with over voltage transient protection that may be utilized in the electronic device and battery pack of FIGS. 1 and 2.

FIG. 3 is block diagram of one embodiment of a secondary over voltage transient protection circuit 126a. The circuit 126a may include an over voltage detector circuit 302. The over voltage detector circuit 302 monitors the cell voltages of each cell 350, 352, 354, and 356 to detect any cell voltage level that exceeds an over voltage threshold level for any duration of time including those of short duration. The over voltage detector circuit 302 may then provide an output signal representative of whether a voltage level of any of the cells 350, 352, 354, and 356 is greater than an over voltage threshold level, e.g., 4.2 volts.

When the over voltage detector circuit 302 provides an output signal representative of a voltage level of one of the cells greater than the over voltage threshold level, the secondary battery protection circuit 126a may then take steps to protect the cells 350, 352, 354, and 356 from such an over voltage transient condition. Such protection may include opening an appropriate switch S1 or S2 to isolate the cells from the over voltage condition. Such protection may also include increasing an internal resistance of the appropriate switch S1 or S2 when in a conducting state to limit the voltage level to the cells to an appropriate level.

The switches S1 and S2 may be any variety of transistors such as field effect transistors (FETs) 340, 342 with the secondary battery protection circuit 126a providing a control signal to the gate of the FETs. The control signal may be a digital signal or an analog signal. A digital signal may be utilized to drive the appropriate switch (switch S1 or S2) to an open state to isolate the cells from the over voltage transient condition. An analog signal may also be utilized to control the ON resistance of the switch (when the switch is in a conducting state) to limit the voltage level to the cells to an appropriate level. For instance, when the switch is an FET, the FET may be driven into saturation by the analog signal to cause the FET to act as a variable resistor. Hence, the ON resistance of the FET may be controlled by the analog signal to the desired level to limit the voltage level seen by the cells to an appropriate safe level.

Figure 4:
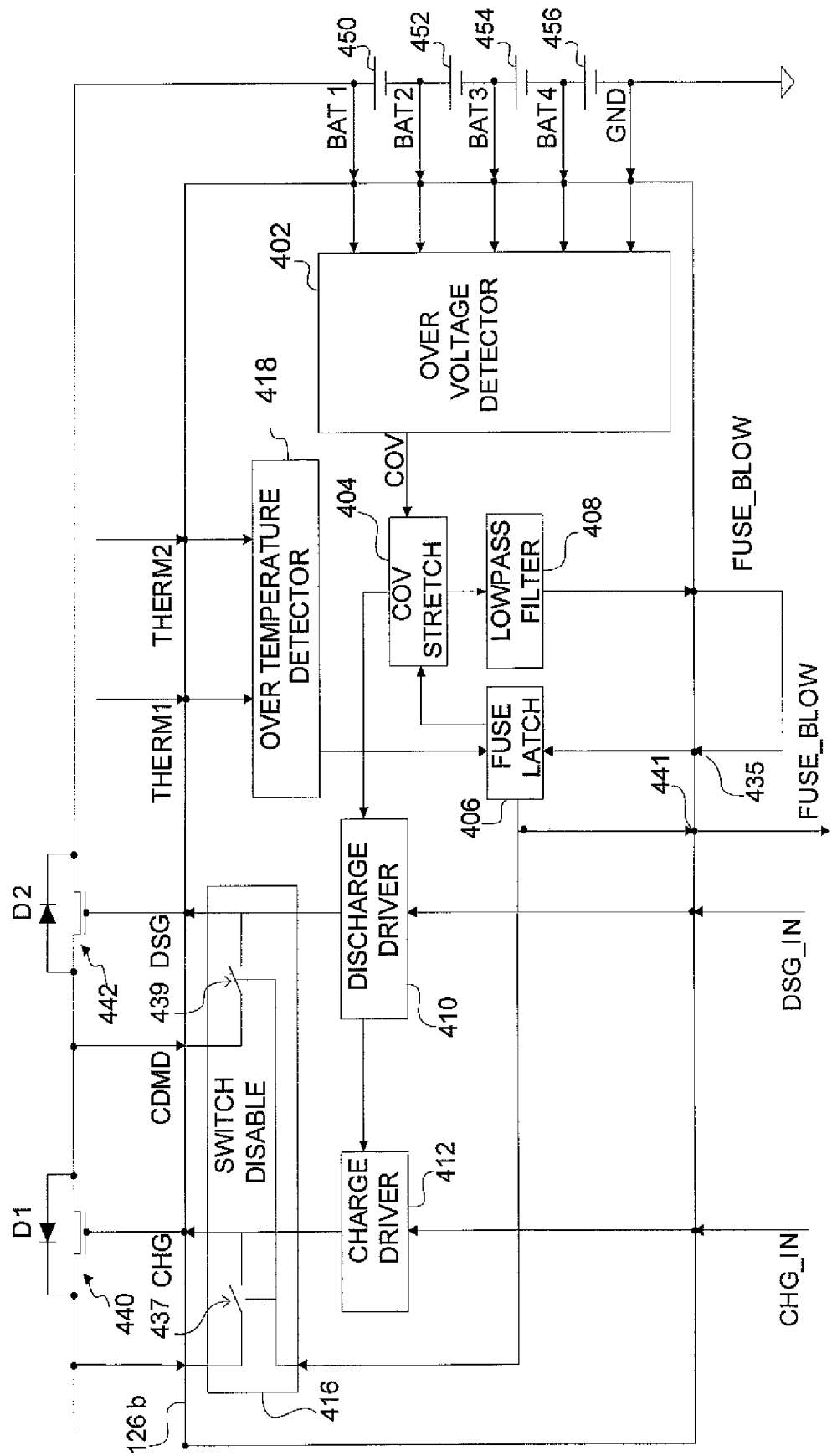
FIG. 4 is a block diagram of another embodiment of a secondary battery protection circuit with over voltage transient protection that may be utilized in the electronic device and battery pack of FIGS. 1 and 2.

Turning to FIG. 4, another embodiment of a secondary battery protection circuit 126b is illustrated. In addition to providing temporary protection to the cells from over voltage transient conditions, the secondary battery protection circuit 126b may also be capable of providing permanent protection to the cells from sustained over voltage conditions. The secondary battery protection circuit 126b may also further be capable of providing permanent protection to the cells from other adverse conditions such as an excessive temperature condition.

The secondary battery protection circuit 126b may include a cell over voltage detector circuit 402, a cell over voltage (COV) stretch circuit 404, a low-pass filter 408, a fuse latch 406, a charge driver 412, a discharge driver 410, a switch disable circuit 416, and an over temperature detector 418. The charge switch S1 and discharge switch S2 of FIG. 1 may be implemented as FETs 440 and 442 respectively.

The over voltage detector circuit 402 monitors the cell voltages of each cell 450, 452, 454, and 456 to detect any cell voltage level that exceeds an over voltage threshold level for any duration of time, even those of short duration. In one embodiment, the over voltage detector circuit 402 may have a switch network to couple each cell to one input of a comparator. The other input to the comparator may be a voltage level equal to the over voltage threshold level. The comparator may then compare a particular voltage level of a cell to the over voltage threshold level and provide an output representative of the results of that comparison.

The over voltage detector circuit 402 may then provide a cell over voltage (COV) digital signal to the COV stretch circuit 404. If the COV digital signal is representative of an over voltage transient condition, the COV stretch circuit 404 maintains that COV signal at that state for a minimum time interval. The COV stretch circuit 404 may also pass the COV signal through the low-pass filter 408 to reject short duration events and output a FUSE_BLOW signal if the COV signal remains high for greater than the transient time interval. The FUSE_BLOW signal may be internally generated as an output of the low-pass filter 408 or externally generated and input to the circuit 126b at terminal 435.

The FUSE_BLOW signal may be latched by the fuse latch 406 and used to permanently disable the charge FET 440 and/or discharge FET 442 by means of a FUSE_BLOWN control signal. The fuse latch 406 may be self resetting, persistent as long as power is applied to the circuit, or permanent by some method such as blowing a Zener-zap diode. In one instance, disabling of the FETs 440 and 442 may be accomplished by shoring the gate and source terminal of each FET. For example, this may be accomplished by the switch disable circuit 416 closing switch 437 to short the gate and source terminal of the charge FET 440 or closing switch 439 to short the source and gate terminal of the discharge FET 442. For additional protection, the FUSE_BLOWN control signal may also disable the FET drivers 412 and 410. The FUSE_BLOWN signal may be output at terminal 441 of the secondary battery protection circuit 126b to provide an indication of such status.

Additional protection features may also be implemented by feeding additional inputs to the fuse latch 406 representative of other adverse conditions that could trigger a permanent disabling of the FETs 440 and 442. Such an adverse condition may be an increased temperature condition, e.g., from the over temperature detector 418. This may be an increased temperature of the cells 120, switches S1 and S2, or other components. The secondary battery protection circuit 126b may be utilized in a battery pack with a thermal fuse F2 (see FIG. 2). The circuit 126b may be capable of protecting the cells 120 from a high temperature condition before the thermal fuse F2 is tripped thereby saving the tripping and replacement of a more expensive thermal fuse F2.

The COV signal from the over voltage detector circuit 402 may also be utilized to temporarily protect the cells 450, 452, 454, and 456 during an over voltage transient condition too short to trigger the FUSE_BLOW signal. In one instance, the COV signal may be input to the COV stretch circuit 404 to stretch or maintain a COV signal representative of an over voltage transient condition for a minimum time interval. This will help to prevent oscillation between opening and closing either the charge or discharge FETs 440 and 442 if short over voltage spikes occur close together.

Figure 5:
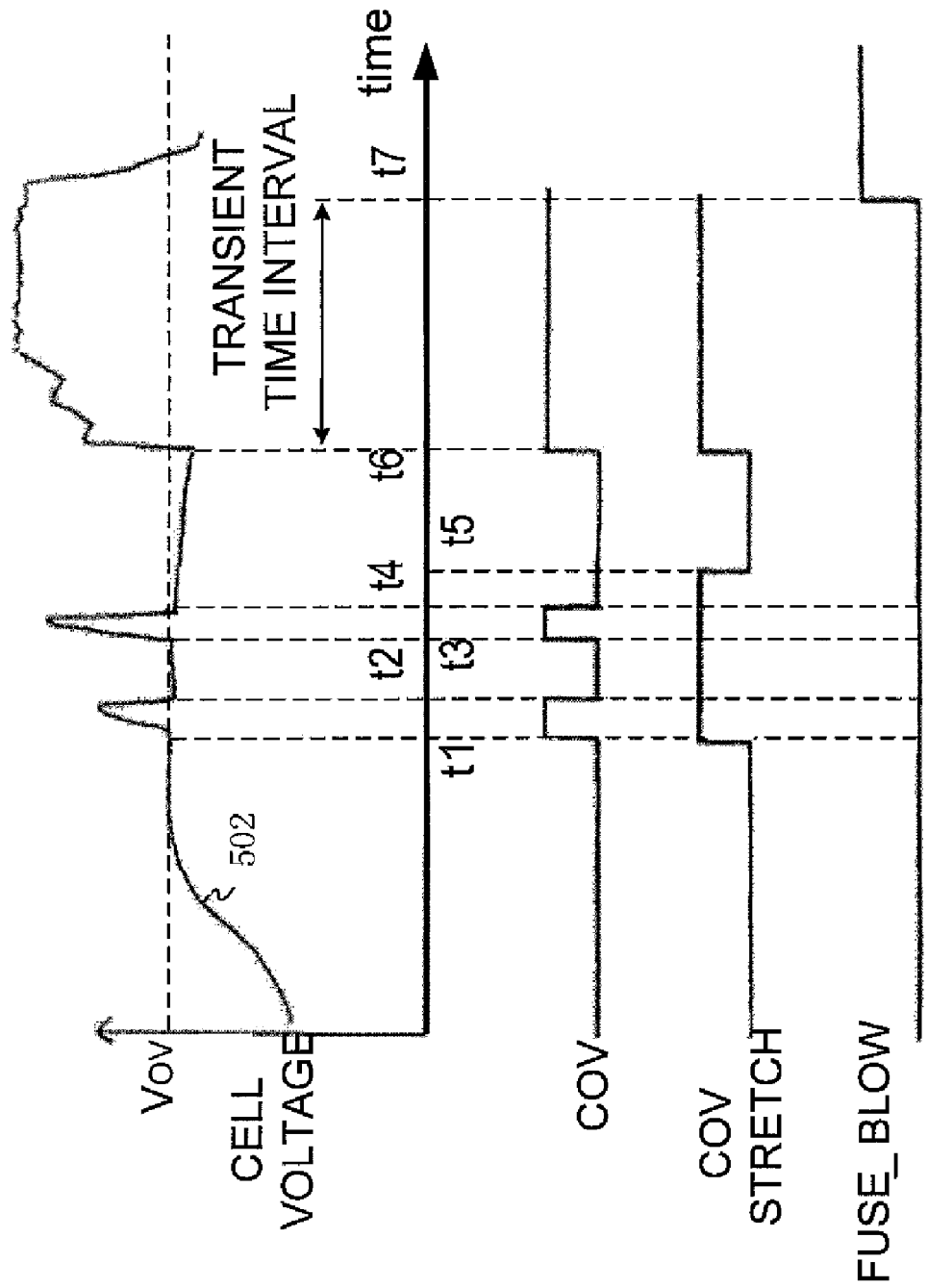
FIG. 5 is a plot of cell voltage over time illustrating short over voltage spikes and sustained over voltage conditions with associated control signals of the embodiment of FIG. 4.

FIG. 5 illustrates a plot 502 of cell voltage versus time in conjunction with the COV signal, the COV stretch signal, and the FUSE_BLOW signal of FIG. 4 to further explain operation of the secondary battery protection circuit 126b of FIG. 4. As long as the cell voltage is less than the over voltage threshold level (Vov), the over voltage detector circuit 402 may provide a digital zero COV signal.

Between times t1 and t2 and between times t3 and t4 an over voltage transient condition is illustrated where the voltage level of the particular cell exceeds Vov. Accordingly, the over voltage detector circuit 402 detects this condition and provides a digital one COV signal between times t1 and t2 and between times t3 and t4. The COV stretch circuit 404 may also provide a digital one signal COV stretch signal starting at time t1 continuing until time t5 to prevent the charge and/or discharge FETs 440 and 442 from opening and closing quickly. For example, during the time interval between times t1 and t5 the COV stretch signal may remain a digital one and the charge and/or discharge FETs 440 and 442 may remain open during this time interval to protect the cells against the over voltage transient conditions.

The over voltage transient conditions between times t1 and t2 and between times t3 and t4 might not be long enough to trigger the FUSE_BLOW signal. In other words, the time interval between times t1 and t2 and between times t3 and t4 might be less than or equal to the transient time interval. However, the over voltage condition starting at time t6 might be greater than the transient time interval (time between times t6 and t7) in order to trigger a permanent protection mechanism. For example, the FUSE_BLOW signal may provide a digital one signal at time t7 or the expiration of the transient time interval. This may then trigger an external fuse element (e.g., fuse element 132 of FIG. 1) and/or trigger the switch disable circuit 416 to permanently disable the FETs 440 and 442.

Therefore, the secondary battery protection circuit 126b may protect the cells from over voltage transient condition, from sustained over voltage conditions, and from other adverse conditions such as excessive temperature. Therefore, (with reference to FIG. 1), one or more of the secondary battery protection circuit 130, filter 128, and fuse element 132 may be eliminated saving component cost and space. Alternatively, such components 130, 128, 132 may be retained and the sustained over voltage protection feature of the secondary battery protection circuit 126 may provide an added layer of reliability for the cells.

In summary, there is provided a secondary battery protection circuit. The circuit may include an over voltage detector circuit configured to monitor a voltage level of an associated cell of a rechargeable battery and provide an output signal to a switch in response to a comparison of the voltage level of the cell to an over voltage threshold level. The switch may be coupled between the rechargeable battery and a DC power source and capable of moving between conducting and non-conducting states. The switch is also responsive to the output signal to protect the rechargeable battery if the voltage level of the cell is greater than the over voltage threshold level for a time interval less than or equal to a transient time interval There is also provided a battery pack including a primary battery protection circuit configured to monitor a condition of a rechargeable battery and provide a charge signal and a discharge signal. The battery pack may also include a secondary battery protection circuit configured to receive the charge and discharge signals from the primary circuit and provide a charge driving output signal and a discharge driving output signal. The secondary battery protection circuit may be configured to monitor a voltage level of at least one cell of the rechargeable battery. The battery pack may also include a charge switch coupled between the rechargeable battery and a DC power source and capable of moving between conducting and non-conducting states. The charge switch may be responsive to the charge driving output signal from the secondary battery protection circuit to protect the rechargeable battery if the voltage level of the cell is greater than the over voltage threshold level during a battery charging mode for a time interval less than or equal to a transient time interval. An electronic device including such a battery pack is also provided.

Advantageously, the secondary battery protection circuit protects the cells of a rechargeable battery against over voltage transient conditions that would otherwise be seen by the cells. Such over voltage transient conditions include any small increase in cell voltage above the over voltage threshold level for a short duration of time less than a transient time interval. The secondary battery protection circuit can also provide backup permanent protection mechanisms for the cells of the rechargeable battery in case of a sustained over voltage condition of a duration greater than the transient time interval. This can enable other circuits providing similar sustained over voltage protection to be eliminate or retained for added redundancy.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A secondary battery protection circuit comprising:
   an over voltage detector circuit configured to monitor a voltage level of an associated cell of a rechargeable battery and generate a cell-over-voltage (COV) signal in response to a comparison of said voltage level of said cell to an over voltage threshold level;
   a COV stretch circuit configured to receive said COV signal from said over voltage detector circuit and to maintain said COV signal for a minimum time interval, said stretch circuit further configured to disable a switch via a self-resetting fuse latch if said COV signal remains high for greater than a transient time interval, said switch coupled between said rechargeable battery and a DC power source and capable of moving between conducting and non-conducting states, said switch also responsive to said COV signal to protect said rechargeable battery if said voltage level of said cell is greater than said over voltage threshold level for a time interval less than or equal to said transient time interval.

2. The circuit of claim 1, wherein said transient time interval is about ten microseconds.

3. The circuit of claim 1, wherein said COV signal comprises a digital signal and said switch protects said rechargeable battery by switching to an open state during at least said transient time interval.

4. The circuit of claim 1, wherein said COV signal comprises an analog signal and said switch protects said rechargeable battery by increasing an internal resistance of said switch in said conducting state in response to said analog signal.

5. The circuit of claim 4, wherein said switch comprises a field effect transistor having a gate terminal, and said gate terminal is responsive to said analog signal to drive said field effect transistor into a saturation state.

6. The circuit of claim 1, wherein if said voltage level of said cell is greater than said over voltage threshold level for a time interval greater than said transient time interval, said secondary battery protection circuit permanently disables said switch.

7. The circuit of claim 6, wherein said switch comprises a field effect transistor having a gate and source terminal and said secondary battery protection permanently disables said field effect transistor by shorting said gate and source terminal.

8. The circuit of claim 1, wherein if a temperature signal input to said secondary battery protection circuit is representative of a temperature condition above a threshold temperature, said secondary battery protection permanently disables said switch.

9. A battery pack comprising:
   a primary battery protection circuit configured to monitor a condition of a rechargeable battery and provide a charge signal and a discharge signal;
   a secondary battery protection circuit including an over voltage detector circuit and a cell-over-voltage stretch circuit, the secondary battery protection circuit configured to receive said charge and discharge signals from said primary circuit and provide a charge driving output signal and a discharge driving output signal, said over voltage detector circuit configured to monitor a voltage level of at least one cell of said rechargeable battery and to generate a cell-over-voltage (COV) signal in response to a comparison between said voltage level and an over voltage threshold level, said cell-over-voltage stretch circuit configured to receive said COV signal and to maintain said COV signal for a minimum time interval; and
   a charge switch coupled between said rechargeable battery and a DC power source and capable of moving between conducting and non-conducting states, said charge switch responsive to said secondary battery protection circuit to protect said rechargeable battery from over voltage transient conditions in response to said COV signal and for at least said minimum time interval.

10. The battery pack of claim 9, wherein said charge driving output signal comprises a digital signal and said charge switch protects said rechargeable battery by switching to an open state.

11. The battery pack of claim 9, wherein said charge driving output signal comprises an analog signal and said charge switch protects said rechargeable battery by increasing an internal resistance of said charge switch during said conducting state in response to said analog signal.

12. The battery pack of claim 11, wherein said charge switch comprises a field effect transistor having a gate terminal, and said gate terminal responsive to said analog signal to drive said field effect transistor into a saturation state.

13. The battery pack of claim 9, wherein said transient time interval is about ten microseconds.

14. The battery pack of claim 9, wherein wherein said secondary battery protection circuit is configured to disable said charge switch in response to said COV signal indicating a sustained over voltage condition having a time interval greater than a transient time interval.

15. The battery pack of claim 14, wherein said charge switch comprises a field effect transistor having a gate and source terminal and said secondary battery protection circuit permanently disables said field effect transistor by shorting said gate and source terminal.

16. The battery pack of claim 9, wherein if a temperature signal input to said secondary battery protection circuit is representative of a temperature condition above a threshold temperature, said secondary battery protection circuit permanently disables said switch.

17. An electronic device comprising:
   a battery pack for providing power to a system, said battery pack comprising:
   a primary battery protection circuit configured to monitor a condition of a rechargeable battery and provide a charge signal and a discharge signal;
   a secondary battery protection circuit including an over voltage detector circuit and a cell-over-voltage stretch circuit, the secondary battery protection circuit configured to receive said charge and discharge signals from said primary circuit and provide a charge driving output signal and a discharge driving output signal, said over voltage detector circuit configured to monitor a voltage level of at least one cell of said rechargeable battery and to generate a cell-over-voltage (COV) signal in response to a comparison between said voltage level and an over voltage threshold level, said cell-over-voltage stretch circuit configured to receive said COV signal and to maintain said COV signal for a minimum time interval; and a charge switch coupled between said rechargeable battery and a DC power source and capable of moving between conducting and non-conducting states, said charge switch responsive to said secondary battery protection circuit to protect said rechargeable battery from over voltage transient conditions in response to said COV signal and for at least said minimum time interval.

18. The electronic device of claim 17, wherein said charge driving output signal comprises a digital signal and said charge switch protects said rechargeable battery by switching to an open state.

19. The electronic device of claim 17, wherein said charge driving output signal comprises an analog signal and said charge switch protects said rechargeable battery by increasing an internal resistance of said charge switch during said conducting state in response to said analog signal.

20. The electronic device of claim 19, wherein said charge switch comprises a field effect transistor having a gate terminal, and said gate terminal responsive to said analog signal to drive said field effect transistor into a saturation state.

21. The electronic device of claim 17, wherein said transient time interval is about ten microseconds.

22. The electronic device of claim 17, wherein said secondary battery protection circuit is configured to disable said charge switch in response to said COV signal indicating a sustained over voltage condition having a time interval greater than a transient time interval.

23. The electronic device of claim 22, wherein said charge switch comprises a field effect transistor having a gate and source terminal and secondary battery protection circuit permanently disables said field effect transistor by shorting said gate and source terminal.

24. The electronic device of claim 17, wherein if a temperature signal input to said secondary battery protection circuit is representative of a temperature condition above a threshold temperature, said secondary battery protection circuit permanently disables said switch.

* * * * *